United States Patent [19]

Ochwat

[11] 4,302,035

[45] Nov. 24, 1981

[54] ONE PIECE ELECTRICAL CONNECTOR

[76] Inventor: Richard S. Ochwat, 1421 Gables, Wheaton, Ill. 60187

[21] Appl. No.: 34,450

[22] Filed: Apr. 30, 1979

Related U.S. Application Data

[63] Continuation-in-part of Ser. No. 19,510, Mar. 12, 1979, abandoned.

[51] Int. Cl.³ .............................................. F16L 3/04
[52] U.S. Cl. ................................ 285/158; 174/65 R; 285/215
[58] Field of Search .............. 285/158, 159, 215, 216, 285/217, 219, 162, 91, 391, 178; 16/2; 174/65 R; 403/194, 195, 197

[56] References Cited

U.S. PATENT DOCUMENTS

| | | | |
|---|---|---|---|
| 2,357,754 | 9/1944 | Moll | 285/219 X |
| 3,322,890 | 5/1967 | Kennedy et al. | 285/158 X |
| 3,369,071 | 2/1968 | Tutsku | 285/158 X |
| 3,379,459 | 4/1968 | Smid | 285/216 X |
| 3,600,008 | 8/1971 | Burry | 285/219 X |
| 3,650,551 | 3/1972 | Akers | 285/158 |
| 3,701,505 | 10/1972 | Klumpp | 285/162 X |
| 3,801,131 | 4/1974 | Appleton | 285/159 |
| 3,814,467 | 6/1974 | Van Buren | 285/162 X |
| 3,899,200 | 8/1975 | Gamble | 285/178 X |

Primary Examiner—Dave W. Arola

[57] ABSTRACT

There is disclosed an improved one piece electrical connector the type intended to interconnect conduit to a junction box which includes at least one circular knockout plug which upon removal, presents a circular knockout portion, formed by a tubular connector body having an outer engagement surface and an inner contacting surface, the outer engagement surface having a threaded portion for engaging the knockout portion of the electrical box, engagement means formed integrally with the threaded portion to lockingly engage the connector in the knockout portion of the electrical box, the outer engagement surface further including a gripping head portion positioned adjacent to the threaded portion to facilitate the gripping of the connector, the threaded portion of the connector body being formed as a substantially frusto-conical section, and the inner contacting surface being provided with conduit gripping means for contacting and gripping conduit inserted within the tubular body. A further embodiment contemplates the entire tubular body having a longitudinal slot extending along the length thereof whereby the tubular body assumes a C shape spring configuration.

12 Claims, 17 Drawing Figures

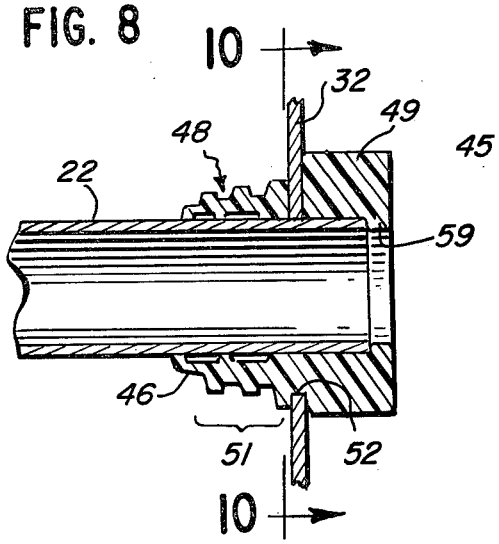
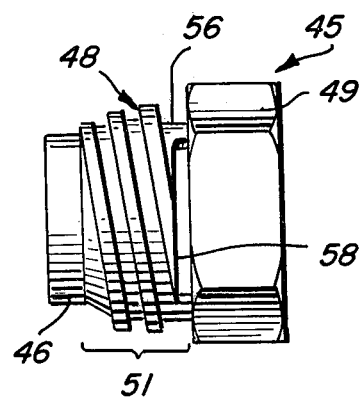
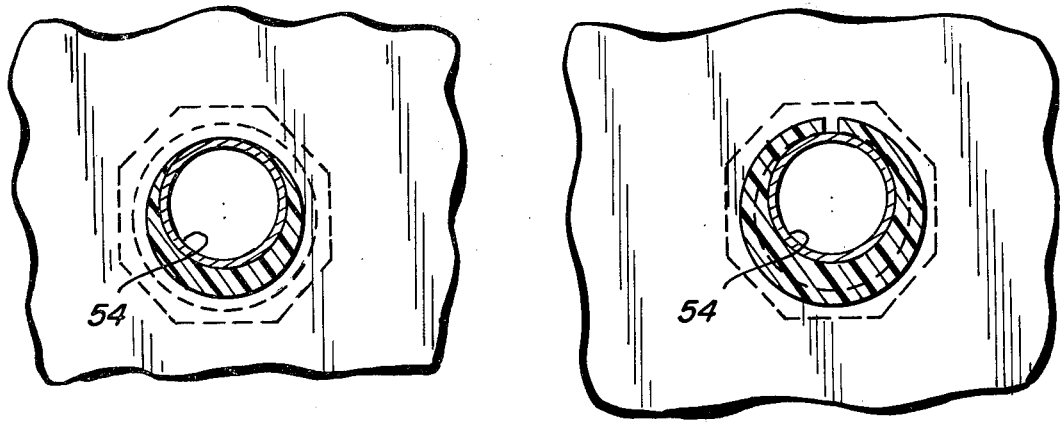
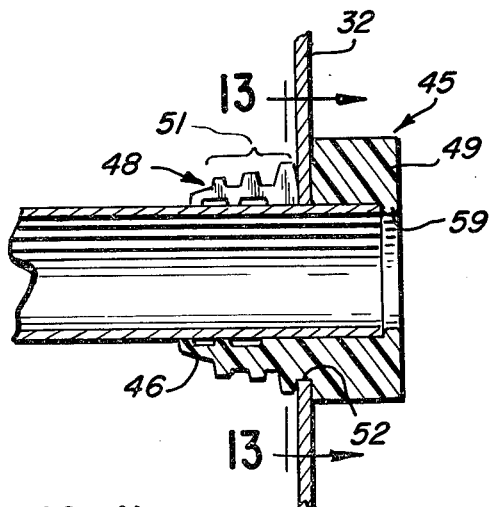
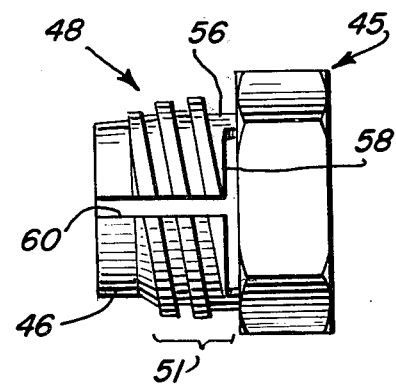

ONE PIECE ELECTRICAL CONNECTOR

CROSS REFERENCE TO RELATED APPLICATION

This application is a continuation-in-part application of presently pending application Ser. No. 19,510, filed on Mar. 12, 1979, now abandoned, entitled ONE PIECE ELECTRICAL CONNECTOR, filed in the name of RICHARD S. OCHWAT.

BACKGROUND OF THE INVENTION

There is a constant ever pressing need for further simplification of devices which currently exist. The principal reason for simplification relates to economics since it is deemed desirable to design an article which will function efficiently to perform a given function but is less expensive in terms of manufacture and therefore in the ultimate cost to the consumer. A further reason for desiring simplification is the fact that the consuming public has turned more to a self help approach toward many job functions, and in the interest of facilitating the consumers desire to perform many job functions on a do-it-yourself basis, simplification of tools, equipment and the like is desirable.

In the area of electrical equipment, one of the most widely used items relates to a connector which functions for interconnecting conduit to an electrical junction box. It will be well understood that in virtually every electrical installation, a plurality of electrical junction boxes are installed for switches, outlets, lights, and the like, and conduit is strung in a manner to interconnect such boxes. It will therefore be appreciated that the electrical connectors utilized to interconnect the conduit to the boxes are probably the most widely used piece of electrical equipment. However, it will be noted that in most instances, electrical connectors are designed and constructed of at least two pieces in order to effect the interconnection. As is commonly known, the connector includes a first piece which has a head portion and a threaded portion, the threaded portion being inserted through the knockout plug in the electrical box, and a thread gripping head which includes a compression ring, which is slid over the conduit until the conduit is inserted into the tubular portion of the threaded and emanating from the electrical box. Once the conduit is in place, the thread gripping portion including the compression ring is screw-threadedly mounted on the threaded end of the connector emanating from the box. By tightening down on the thread gripping head, the compression ring is forced into biting engagement with the conduit.

In the above description, it is quite apparent that the installation of a connector is cumbersome and does require multiple steps incident to the installation. In addition, it has been known that compression rings will often become disengaged from the thread gripping head and in such eventuality, the thread gripping portion of the connector becomes useless.

In another version of an electrical connector, especially useful for flexible conduit, the connector is basically a multi-piece unit which includes a threaded portion intended to be inserted externally through the knockout portion and held in position by a thread gripping nut internally of the electrical box, the flexible conduit gripping means consisting of a bridge from which a grip bar is suspended by two screws. Once the conduit is inserted between the bridge and the grip bar, the screws are tightened thereby to restrain the conduit in position. Once again, an electrical connector of this type is formed by multiple pieces, and therefor requires a multi-step procedure to install. In addition, should any of the pieces become lost, for example, either or both of the screws intended to tighten the grip bar down against the bridge, the connector becomes useless and must be discarded.

In terms of the patented art, various attempts have been made to simplify an electrical connector from both the economic standpoint, as well as the standpoint of the installation. The ultimate goal is to achieve a one-piece electrical connector which is of ultimate simplicity in terms of the steps of installation.

It will be observed that in U.S. Pat. No. 3,369,071, basically a one-piece electrical connector is illustrated therein. It will be noted that the connector therein includes a head portion intended for insertion through the knockout portion of the electrical box, and a conduit carrying portion or sleeve which extends externally of the box. The head portion is retained internally of the box by means of a pair of tongues which must be pried outwardly away from the head portion such that they are positioned behind the wall of the electrical box. Forward of the head portion is a rib or projection such that the electrical connector is in effect fixably mounted as between the tongues which are extended, and the rib portion which is external thereto. The conduit or cable is fished through the sleeve portion and held in position by a plurality of dimples on the inner surface of the wall, as well as by means of a shoulder which is, in effect, a cut in the wall of the sleeve portion causing a biting corner to bite into the conduit wall.

While the device depicted in U.S. Pat. No. 3,369,071 would appear to simplify the electrical connector art, nevertheless, a device of this type has not achieved any degree of commercial success for the reason that it is believed that it is difficult for the user thereof to manipulate the connector when inserted in the box in order to engage the connector to the box. For example, it will be observed that one must insert a tool of some kind, such as a screwdriver or the like, with a view toward engaging the tongues to bend them outwardly in order to securely affix the connector to the box. This often is difficult, especially where an electrical box is located in a tight area. In addition, a connector of this type which requires that the sleeve body be cut into in order to form a shoulder to grip against the conduit would probably not be accepted by most building codes since it necessarily means that there is an open space in the connector which could permit the passage of a spark in the event of a short. Hence, a connector of this type would likely not be approved by any modern electrical code.

Another version of an approved electrical connector is shown in U.S. Pat. No. 3,801,131 which basically relates to a two piece connector. There is provided a threaded portion which has a head, the threaded portion being inserted from internally of the box and extending outwardly and includes a nut portion which screw-threadedly fastens onto the threaded portion once the conduit is inserted in position. It will further be noted that the nut portion includes a section of deformable material forming a part of the tubular body, while the interior surface of the threaded portion includes a series of annular ridges for gripping the conduit. When the nut portion is screw-threadedly tightened onto the threaded portion, it will be apparent that the tubular body forms around the deformable material causing the annular ribs to bite into the conduit and retain the electrical cable in position. While the device shown in Patent 3,801,131 appears to be a more simplified device since it consists of two pieces, nevertheless, it will be appreciated that the cost of manufacture would be significant since the device must be made with a deformable section embedded in the body of a tubular threaded portion member. Hence, a device of this type has not found wide acceptance commercially as an alternate type of connector for use in the domestic market.

Still another form of a connector intended as a simplified or one-piece structure is shown in U.S. Pat. No. 3,814,467. In this instance, the connector is designed to interconnect flexible conduit such as B-X cable to an electrical box. It will be noted in this instance that the connector is formed with a pair of flared-out ribs such that the inner portion of the connector may be secured to the internal portion of the box, while the external portion includes a lip intended to override one of the contoured ribs of the flexible conduit. It will be appreciated, however, that once again due to the precise construction of the connector shown in U.S. Pat. No. 3,814,467, the cost of manufacture is significant since it entails the provision of a number of flared ribs, contoured ribs, and the like. In addition, a connector of this type would not be particularly suitable for a smooth wall type conduit and hence, could only find application in connection with the flexible type B-X cable.

Various other types of connectors are shown in other patents. For example, U.S. Pat. No. 3,701,505 shows still another version of a connector which includes the structure of a bridge and gripping bar which may be tightened by screw-threadedly fastening the screws. This type of connector is well known in the art. As indicated previously, however, the connector shown therein necessarily requires construction from a plurality of parts, which necessarily increases the cost of construction and requires more manipulative steps in order to install.

In most other instances, the connectors intended for use on electrical boxes require, at the very least, two parts. The first general part is generally inserted from the inside of the electrical box or junction box and extends outwardly such that a threaded portion is exposed externally of the box, and a threaded nut portion is utilized for fastening down onto the threaded portion. This, for example, is typical of the construction shown in U.S. Pat. No. 3,600,008.

It is believed that a more simplified version of a connector which is essentially one-piece in construction, and eliminates costly manufacturing steps is desirable, and would find a broad level of acceptance. The present invention seeks to provide such a one-piece electrical connector.

OBJECTS AND ADVANTAGES

It is the principal object of the present invention to provide a simplified one-piece electrical connector which is economic to manufacture, and simple in terms of usage.

In connection with the foregoing object, it is yet a further object of this invention to provide a one-piece electrical connector of the type adapted to interconnect a length of electrical conduit to an electrical box having at least one circular knockout plug which upon removal, presents a circular knockout portion and at least one residual tab formed by a substantially tubular connector body having an outer engagement surface and an inner contacting surface, the tubular connector body being sized to accomodate the insertion therein of a length of electrical conduit, the outer engagement surface having a threaded portion for engagement with the circular knockout portion of the electrical box, residual tab engagement means associated with the threaded portion adapted to engage and lock with the residual tab formed in the circular knockout portion, the outer engagement surface being further provided with a gripping head portion positioned adjacent to the threaded portion, the threaded portion of the connector body being formed as a substantially frusto-conical section, and the inner contacting surface being provided with conduit gripping means for contacting and gripping a portion of the conduit which is inserted within the tubular connector body.

In conjunction with the foregoing object it is yet a further object of the invention to provide a one-piece electrical connector of the type described wherein the tubular connector body is split along the entire length thereof by a longitudinal slot which traverses the threaded portion and the gripping head portion such that the tubular connector body assumes a C shape spring configuration.

Still a further object of the invention is to provide a simplified one-piece electrical connector of the type described above wherein the residual tab engagement means comprises a constricted terminal thread formed in the threaded portion of the connector body such that the residual tab is wedgingly locked in the constricted terminal thread when the connector body is fully threaded within the knockout portion having a residual tab formed therein.

In connection with the foregoing objects it is yet a further object of the invention to provide a simplified one-piece electrical connector of the type described wherein the residual tab engagement means is formed by a terminal thread having at least one receiving slot formed therein, the receiving slot being adapted to receive the residual tab when the connector body is fully threaded within the knockout portion.

Still a further object of the invention is to provide an electrical connector of the type described wherein the residual tab engagement means is formed by a circular terminal thread having only an ingress thread and no egress thread such that the residual tab may be received into the terminal thread when the connector body is fully threaded within the knockout portion, but that the residual tab may not egress therefrom when reverse threaded.

Yet a further object of the invention is to provide an electrical connector of the type described wherein the engagement means for lockingly engaging the connector to the knockout portion of the electrical box is formed by a threaded portion which includes a thickened section offset from a slotted portion adjacent to the terminal end of the threaded portion such that the offset thickened section will force the wall of the electrical box to ride into the slotted portion until biting contact is established between the wall of the electrical box and a length of conduit contained within the tubular body of the connector.

Still another object of the invention is to provide another embodiment of a one-piece electrical connector of the general type described wherein the engagement means for lockingly engaging the connector to the knockout portion of the electrical box is formed by a terminal thread provided with a plurality of ratchet teeth which engage the periphery of the knockout portion as the connector is tightened therein thereby to prevent removal once inserted in the knockout opening.

BRIEF DESCRIPTION OF DRAWINGS

In connection with the drawings, the figures depicted therein may be described as follows:

FIG. 8 is a side elevational view, in cross section, showing still another embodiment of a one-piece connector wherein the terminal thread is slotted, and the threaded portion is offset in order to provide locking engagement means for lockingly engaging the connector to the electrical box;

FIG. 9 is a side elevational view showing the electrical connector including the slotted portion in the terminal thread, as shown in FIG. 8;

FIG. 10 is a back view of the connector taken along the lines 10—10 of FIG. 8 illustrating the offset configuration of the threaded portion;

FIG. 11 is a side elevational view, and cross section, showing still another embodiment of a one-piece electrical connector which includes a slotted portion along the terminal thread, and wherein the threaded portion includes a longitudinal slot extending the length of the connector body, and wherein the threaded portion is offset in order to form the locking engagement means;

FIG. 12 is a side elevational view showing the embodiment of the connector as depicted in FIG. 11;

FIG. 13 is a rear view of the connector as depicted in FIG. 11, taken along the lines 13—13;

BRIEF SUMMARY OF INVENTION

Figure 1:
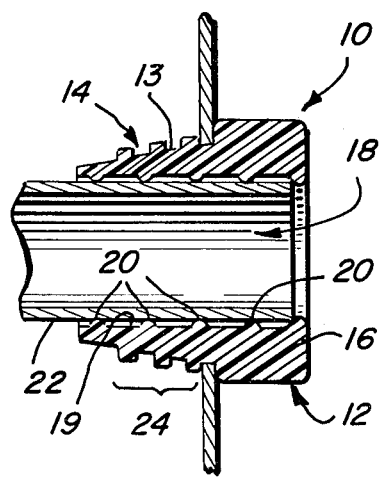
FIG. 1 is a side elevational view, in cross section, showing one embodiment of the one-piece electrical connector in position relative to the knockout portion of an electrical box.

In summary, the present invention is directed to a simplified version of a one-piece electrical connector which is formed of a single unitary piece which is designed to co-act with the knockout portion of an electrical box of the type wherein the knockout portion has a residual tab remaining in position after the plug is removed. The electrical connector includes residual tab engagement means for engaging the residual tab as a means of positively locking the connector into position on the box, and conduit gripping means associated with the interior portion of the tubular connector body in order to grip and lock a length of electrical conduit inserted therein. The one-piece electrical connector of the present invention may be in the form of one that has a longitudinal slot extending the length of the connector body such that the same may be compressed during the screw threading action to insert the same in the knockout portion of the electrical box, compressing the two adjacent members together thereby to grip the conduit wall which is inserted through the tubular connector body; or may be of the type which eliminates the longitudinal slot and includes in lieu thereof, a compression tab carried adjacent to the terminal thread of the threaded portion of the connector body which is formed in the shape of a frusto-conical section, such that upon the screw threading motion, the body of the electrical connector will constrict and force the compression tab downwardly into biting contact with the conduit inserted in the connector body.

In another embodiment of the subject one-piece electrical connector, the connector is designed to simply lockingly engage in a knockout opening in an electrical box regardless of whether or not the residual tab exists. Several embodiments of the invention provide a connector which includes a terminal thread designed to co-act with the periphery of the knockout opening in order to lockingly engage the connector in position on the electrical box. One such embodiment is formed by a connector wherein the terminal thread is slotted with the treaded portion being offset in terms of thickness, such that upon screwed threadingly engaging the connector into the knockout opening, the offset portion has a cam effect and will thereby cause a portion of the periphery of the knockout opening to ride into the terminal slot and come in to biting contact with the conduit carried therein.

In another embodiment, the terminal thread is provided with a plurality of ratchet teeth which are designed to co-act with the periphery of the knockout opening upon threaded engagement thereby forming the locking means to lock the connector in place in an electrical box.

It will be apparent from the following description that the one-piece electrical connector of the present invention may be easily stamped or molded as a integral piece, and eliminates any extraneous structures which would necessitate, in use, the need or requirement for any complicated or difficult installation procedures.

DETAILED DESCRIPTION OF DRAWINGS

Figure 2:
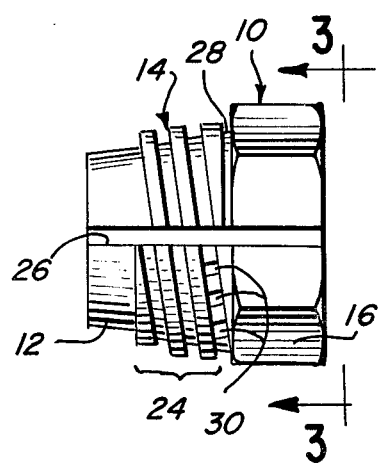
FIG. 2 is a side elevational view of the embodiment of the one-piece electrical connector as depicted in FIG. 1, showing the longitudinal slot extending the length of the connector body.
Figure 3:
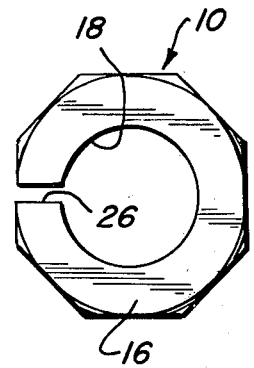
FIG. 3 is a top view of the one-piece electrical connector taken in the direction of the arrows along the line 3—3 of FIG. 2.

With reference to the drawings, the various embodiments of the electrical connector of the present invention are illustrated. In FIGS. 1 through 3 of the drawings, one of the embodiments of the electrical connector, generally depicted by the numeral 10, is illustrated. The electrical connector 10 is shown to be formed by connector body 12 which includes a threaded portion generally denoted by the numeral 14, and the head gripping portion generally denoted by the numeral 16. The connector body 12 is shown to have a hollow body as denoted by the numeral 18, and is as further shown in FIGS. 1 and 2 of the drawings, the electrical connector 10, including the threaded portion 14 and the head gripping portion 16 is shown to be integrally formed.

As shown in FIG. 1, the electrical connector 10 presents an outer engagement surface 13 which is formed by the threaded portion 14 and head gripping portion 16, and an inner contacting surface 19 forming the wall of the hollow body 18. The inner contacting surface 10 shown further include a series of four gripping rings 20 which, as further shown in FIG. 1, serve to form the conduit engaging means for engaging the outer surface of a length of electrical conduit 22 inserted within the hollow body 18 of the connector 10.

As will also be seen in FIGS. 1 and 2 of the drawings, the threaded portion 14 of the connector body 12 is formed as a frusto-conical section generally denoted by the numeral 24, which serves a purpose to be defined more specifically hereinafter.

In FIGS. 2 and 3 of the drawing, it will be observed that the connector body 12 also includes a longitudinal slot 26 which traverses the entire length of the connector body 12. As specifically shown in FIG. 3 of the drawings, the longitudinal slot 26 causes the connector body 12 to assume a C shape spring configuration. It will therefore be appreciated that tension may be applied to the opposed sections on either side of the longitudinal slot 26 thereby to biasingly urge the two sections together as pressure is applied. Pressure may be applied when the connector body 12 is screw-threadingly mounted into a corresponding knockout portion in a manner to be described hereinafter.

In the embodiment of the electrical connector 10 depicted in FIG. 2, the threaded portion 14 is shown to terminate at a terminal thread 28 which is provided with a series of three receiving slots 30. The receiving slots 30 are positioned along the path of the terminal thread 28 and function in a manner to positively lock the connector body 12 in position in a knockout portion of an electrical box as will be described in connection with FIG. 4 of the drawings.

Figure 4:
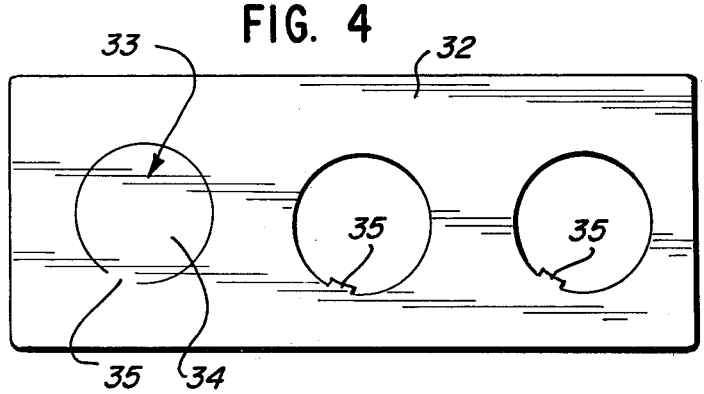
FIG. 4 is a side elevational view showing a typical electrical box including three knockout portions, one knockout plug being in place, and two knockout plugs having been removed with a residual tab in position therein.

With reference to FIG. 4 of the drawings, a configuration of a typical electrical box 32 is illustrated. In the typical commercial embodiment of such box as 32, there is provided one or more knockout portions 33 which are formed by a knockout plug 34 which is held in position by a tab 35. As is commonly known in the electrical art, once the knockout plug 34 is removed manually, the tab 35 becomes a residual tab 35 as shown in FIG. 4. It will therefore be appreciated that in virtually every electrical box available, once the knockout plug 34 is sheared from the knockout portion 33, a residual tab 35 remains. It is the intention of the present invention to utilize the residual tab as a means for positively locking the electrical connector 10 into position in the electrical box 32. With reference, once again, the FIG. 2 of the drawings, there is provided a series of three receiving slots 30 formed in the terminal thread 28 of the threaded portion 14. It will be appreciated that as the connector body 12 is screw-threadedly mounted into the knockout portion 33 once the knockout plug 34 has been removed, as the threaded portion 14 threads over the residual tab 35, the residual tab 35 will ultimately find its way to one of the receiving slots 30 thereby to be positively locked in position in the electrical box 32. Simultaneously, the user would insert a length of electrical conduit 22 into the hollow body 18 such that as the connector body 12 is screw-threadedly mounted in the knockout portion 33, and as the residual tab 35 engages the threaded portion 14 and approaches the terminal thread at 28 containing the receiving slots 30, a force exerted by the periphery of the knockout portion 33 will biasingly urge the opposed sections forming the C shape configuration of the connector body 12 together, thereby causing the gripping rings 20 to bite into the outer surface of the length of conduit 22 carried within the hollow body 18. Hence, the screw-threaded mounting of the electrical connector body 12 into the electrical box 32 will simultaneously lock the connector body 12 into position, while at the same time, cause a gripping action to occur with respect to the conduit 22 carried therein. It will therefore be appreciated that both functions are attained during the screw-threaded mounting of the electrical connector 10 into the electrical box 32. It will also be appreciated that the head gripping portion 16 is formed as an octagonal head in order to facilitate the use of any form of gripping tool such as a pliers, wrench, or the like, in order to permit the user to apply a significant amount of manual pressure to obtain a positive lock of the electrical connector 10 in position and simultaneously cause a positive grip of the conduit 22 contained therein.

Figure 5:
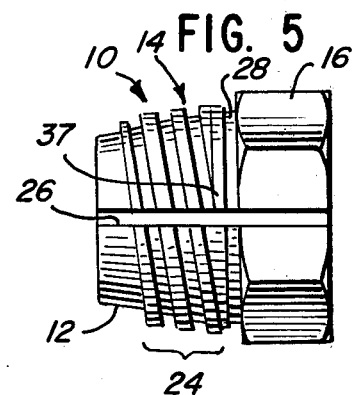
FIG. 5 is a side elevational view of still another embodiment of a simplified one-piece electrical connector of the present invention wherein the residual tab engagement means as shown to be formed by a terminal thread which is substantially circular and includes only an ingress and no egress thread.

In FIG. 5 of the drawings, still another embodiment of the electrical connector of the present invention is illustrated. For purposes of simplicity, like parts will be referred to by like numbers. It will be noted that the electrical connector 10 again is formed by connector body 12 which is formed by a threaded portion 14 and a head gripping portion 16. A longitudinal slot 26 is provided which traverses the entire length of the connector body 12. In this embodiment, the terminal thread 28 is shown to be substantially circular thread, access to which is had only by way of an ingress thread 37. It will therefore be appreciated that as the connector 10 is screw threadedly mounted into the knockout portion 33 of a box 32, the residual tab will enter the terminal thread 28 through the ingress thread 37 and be captured therein. Should the connector 10 be reversedly threaded, the residual tab 35 will have no egress thread and therefore, will remain captured within the terminal thread 28. In addition, and in the preferred version of the embodiment depicted in FIG. 5 of the drawings, the terminal thread 28 may be slightly constricted such that when manual pressure is applied to screw-threadedly mounted connector 10 into the knockout portion 33 of the box 32, the residual tab 35 will be wedgingly engaged within the confines of the terminal thread 28.

As is illustrated with respect to the embodiment shown in FIGS. 1 through 3 of the drawings, the inner contacting surface (not shown) with respect to FIG. 5 will again include a plurality or series of gripping rings 20 such that a length of electrical conduit 22 positioned in the hollow body 18 would be grippingly engaged. Hence, the principal difference between the embodiment depicted in FIG. 5 of the drawings, and the embodiment shown in FIG. 2 of the drawings, resides in the residual tab engaging means, which in FIG. 2 is shown to be a series of receiving slots 30, and in FIG. 5, is shown to be formed by a constricted terminal thread 28 having only an ingress thread 37.

As is further evident from the drawings, in connection with the embodiment shown in both FIGS. 2 and 5 of the drawings, the sizing of the frusto-conical section 24 is such that as the connector 10 is screw-threadedly mounted into the knockout portion 33, the connector body 12 is caused to biasingly constrict along the length of longitudinal slot 26 thereby causing the opposed sections to be urged together simultaneously cause the locking engagement of the connector body 12 within the knockout portion 33, and the positive gripping of the conduit 22 within the hollow body 18.

Figure 6:
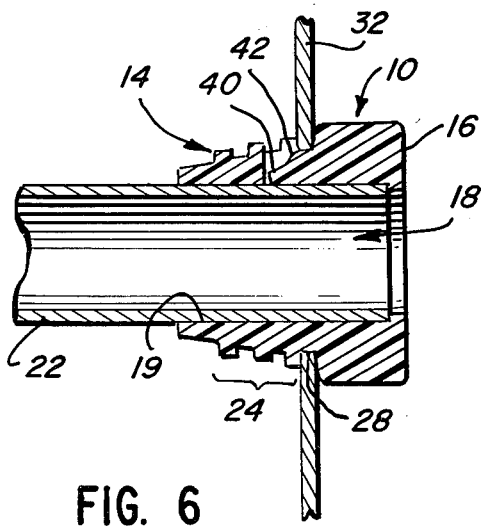
FIG. 6 is a side elevational view, in cross section, showing still another embodiment of a simplified one-piece electrical connector of the present invention in position in an electrical box and juxtaposed about an electrical conduit, the electrical connector eliminating the longitudinal slot but including a compression tab which forms the conduit gripping means for grippingly engaging the electrical conduit.
Figure 7:
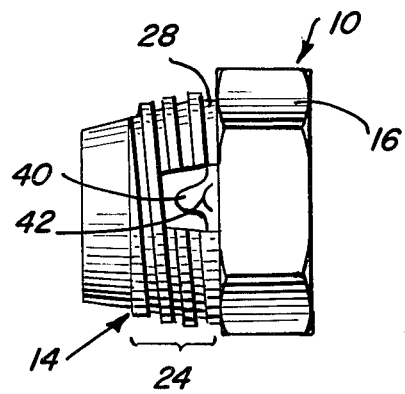
FIG. 7 is a side elevational view of the one-piece electrical connector of the type depicted in FIG. 6 showing the configuration of the compression tab relative to the terminal thread of the connector.

With respect to FIGS. 6 and 7 of the drawings, still another embodiment of the present invention relating to an electrical connector is depicted. Again, like numbers will be utilized to refer to like parts. The electrical connector 10 of FIGS. 6 and 7 is, again, shown to be formed by connector body 12, including a threaded portion 14, and a thread gripping portion 16. The threaded portion 14 is formed as a frusto-conical section 24 in the manner illustrated. Again, the inner contacting surface 19 forms the confines of the hollow body 18 thereby to accomodate the electrical conduit 22 therein. The threaded portion 14 terminates in a terminal thread 28. It will be observed that in connection with the embodiment shown in FIGS. 6 and 7 of the drawings, a compression tab 40 is formed out of the threaded portion 14 of the connector body 12. The compression tab 40 further includes a compression nib 42 which rises externally into the terminal thread 28.

In use, as the electrical connector 10 depicted in FIGS. 6 and 7 of the drawings is screw-threadedly mounted into the knockout portion 33 of electrical box 32, as the periphery of the knockout section reaches the terminal thread 28, the compressional force will be exerted on the compression nib 42 which in effect forces the compression tab 40 in a downward direction. The user will have inserted the electrical conduit 22 within the hollow body 18 of the connector 10 such that as the screw-threaded mounting action occurs, the compression tab 40 will bite into the surface of the electrical conduit 22 and cause a negative gripping thereof. Simultaneously, the compression nib 42 will frictionally engage the periphery of the knockout portion 33 thereby causing a tightening of the electrical connector 10 in position in the knockout portion 33. Hence, simultaneously, a locking engagement is caused as between the electrical connector 10 and the electrical box 32, as well as a positive locking of the conduit 22 within the confines of the hollow body 18 by means of the compression tab 40.

In FIGS. 8 through 15 of the drawings, various embodiment of the present invention are illustrated wherein the requirement for residual tabs in the knockout portion of the electrical box is obviated. It is recognized that in some instances, an electrician or other operator may, in fact, create an opening in an electrical box by means of a power tool or other appropriate tool. In such event, it is recognized that a residual tab will not be present, especially where an electrical drill type implement is utilized to create the opening. Hence, it is deemed advisable that an embodiment of the invention should be provided which can be utilized in connection with drilled knockout openings.

As is shown in FIGS. 8 through 10 of the drawings, an embodiment of an electrical connector 45 is illustrated which is formed by connector body 46 including a threaded portion 48 and a head gripping portion 49. Once again, the threaded portion 48 is shown to be in the form of a frusto-conical section 51 and constructed to be screw threadedly engageable in the knockout opening 52. It will further be observed that the threaded portion 48 has an offset hollow opening 54 (FIG. 10), such that the interior opening 54 is offset with respect to the outer surface of the threaded portion 48. In addition, the terminal thread 56 (FIG. 9) is provided with an open slot 58 which co-acts with the offset hollow opening 54 in order to provide a locking engagement structure. It will be observed that as the threaded portion 48 is inserted into the knockout opening 52 and screw threaded therein, the offset design of the interior hollow opening relative to the exterior surface will cause a portion of the periphery of the knockout opening 52 to ride into the open slot 58 of the terminal thread 56. Hence, it will be observed that a portion of the periphery of the knockout opening 52 will come into biting contact with the electrical conduit 22 positioned within the hollow opening of the connector 45.

It will further be noted that an additional feature of the connector 45 includes a stop flange 59 which is formed as a part of the head gripping portion 49, and functions to provide a stop surface against which the electrical conduit 22 will rest when inserted therein.

With regards to FIGS. 11 through 13 of the drawings, a slightly modified version of the embodiment shown in FIGS. 8 through 10 is illustrated. For the sake of convenience, like numerals have been utilized to designate like structure. It will be observed that the embodiment shown in FIG. 11 again shows an electrical connector 45 formed by connector body 46 including a threaded portion 48 and a head gripping portion 49. The threaded portion 48 is formed as a frusto-conical section 51 and is designed to be threadedly engaged in a knockout opening 52. In addition, the embodiment of FIG. 11 is shown to include an offset hollow opening 54 (FIG. 13) whereby the interior hollow opening of the connector body 46 is offset relative to the external surface of the frusto-conical section 51. The terminal thread 56 is provided with an open slot 58 which functions to accept a portion of the periphery of the knockout opening 52 as the connector 45 is screw threadedly mounted into the knockout opening 52.

The additional feature provided by the connector of FIGS. 11 through 13 is the fact that a longitudinal slot 60 is provided thereby to create a C shaped compressional spring configuration which functions in the same manner as the connector illustrated in FIGS. 2 and 5 of the drawings. It is believed that by providing the longitudinal slot 60, the insertion and screw threading action while applying the connector 45 to an appropriate knockout opening 52 is facilitated since the opposed sides of the frusto-conical section 51 may be compressionally forced together during the screw threading action, and will release upwardly once the periphery of the knockout opening 52 has ridden into the open slot 58 of the terminal thread 56.

It will be appreciated that where the embodiment shown in FIGS. 8 through 13 of the drawings are utilized, the electrical conduit 22 carried within the hollow confines of the connector 45 will be slightly off center as compared to the center line of the knockout opening 52. This is not considered to be particularly relevant since one only wishes to achieve a solid and positive locking arrangement between the electrical conduit 22 and the electrical box 32.

Figure 14:
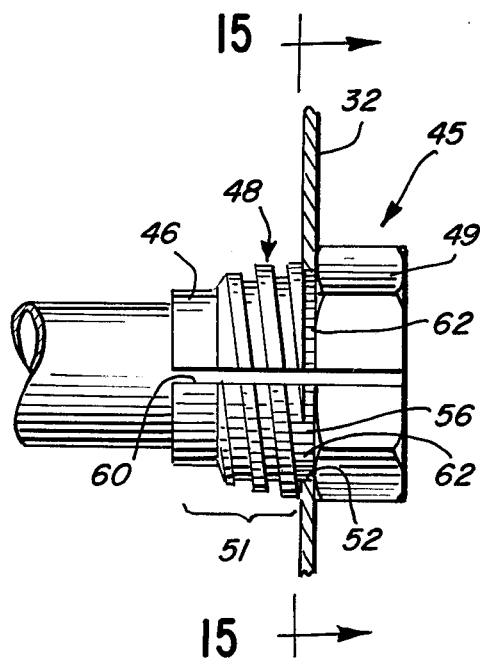
FIG. 14 is a side elevational view of still another embodiment of a one-piece electrical connector of the present invention, wherein the terminal thread includes a plurality of ratchet teeth designed to engage the knockout portion of the electrical box, and wherein the connector body is slotted along the length thereof to provide a C shaped spring configuration.
Figure 15:
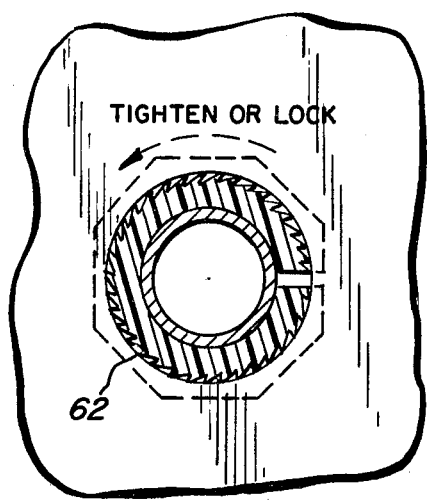
FIG. 15 is a back view of the connector as shown in FIG. 14, taken along the lines 15—15.

With respect to FIGS. 14 and 15 of the drawings, still another embodiment of a one-piece electrical connector is illustrated, which connector is designed to lockingly engage in a knockout opening wherein the residual tabs are non-existent. Once again, it is contemplated that where the electrician or other operator creates an opening in an electrical box by means of a drill or other tool, the residual tab will not exist, and it is therefore necessary that a connector be designed which will positively lock in position. Once again, for purpose of simplicity, like numbers are utilized to denote like structures.

With regard to FIG. 14, electrical connector 45 is illustrated form by connector body 46, and including a threaded portion 48 and a head gripping portion 49. The connector 45 is provided with a terminal thread 56, but in this embodiment, the terminal thread 56 is provided with a plurality of ratchet teeth 62. Finally, the connector 45 is completed by a longitudinal slot 60 reversing the entire length thereof such that a C shaped spring configuration is achieved.

It will be appreciated that in order to install the connector 45 as depicted in FIG. 14, the threaded frusto-conical section 51 is screw threadedly engaged into the knockout opening 52 of the box 32. The periphery of the knockout opening 52 will eventually ride into the terminal thread 56, and it will be appreciated that the ratchet teeth 62 will then engage the peripheral surface thereof. The ratchet teeth 62 are designed such that to tighten or lock the connector 45 into position, the smooth portion of the teeth will ride along the periphery of the knockout opening 52. If one attempts to unscrew the connector from the opening 52, the ratchet teeth 62 will bite into the peripheral surface and prevent removal or at least render removal difficult. In this manner, a positive lock of the connector 45 into the opening 52 is achieved.

Figure 16:
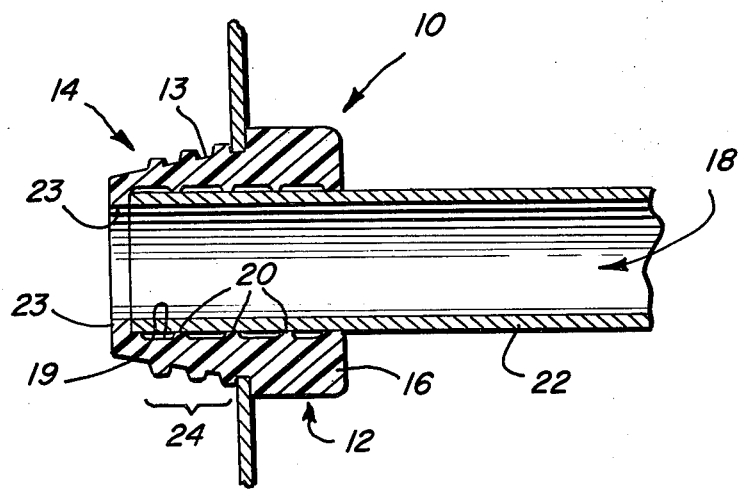
FIG. 16 is a side elevational view, in cross section, showing an embodiment of the one piece electrical connector wherein the conduit stop is formed at the threaded end of the subject connector.

The embodiment as shown in FIG. 16 of the drawings represents the connector 10 as previously illustrated in FIG. 1. It will be noted that with respect to FIG. 1, the connector therein shown to further include stop bosses 23 which function to provide a stop position for the conduit 22 which is inserted through the hollow body 18 of the connector body 12. As illustrated in FIG. 16 of the drawings, the electrical connector 10 may be constructed with a connector body 12 wherein the stop bosses 23 are incorporated at the end of the threaded portion 14, specifically at the restricted end of the frusto-conical section 24. It would be apparent, therefore, that the electrical connector 10 may be inserted from the external portion of an electrical box with the conduit 22 inserted there through until it reaches the stop bosses 23 internally of the box. The connector 10 would then be screw threadedly fitted to the box screw threadedly turning the connector 10 from a position external to the box. It will therefore be appreciated that the electrical connector 10 illustrated in FIGS. 1 and 16, as well as all of the other embodiments illustrated herein, may be formed with stop bosses either at the thread gripping portion 16, or at the threaded portion 14, and indeed, two versions of the subject electrical connector may be manufactured. The two versions would permit the user to install the electrical connector from either the internal portion of the electrical box with the head gripping portion located internally of the box, or to install the connector from externally of the box with the head gripping portion located externally of the box. The appropriate stop bosses would be utilized to either cause the conduit to stop and rest against the end of the threaded portion of the connector, or to rest against a stop boss formed in the internal portion of the head gripping portion.

Figure 17:
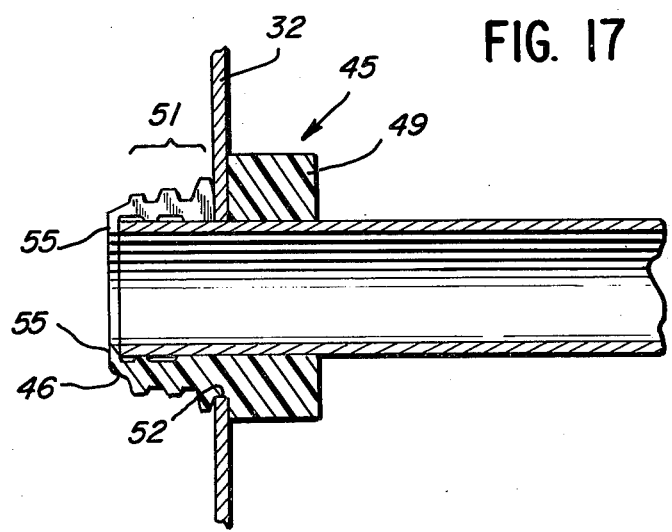
FIG. 17 is a side elevational view, in cross section, showing still another embodiment of the subject electrical connector wherein the conduit stop is again located at the threaded end of the connector.

With respect to FIG. 17 of the drawings, once again, the embodiment of the electrical connector 45 as illustrated in FIG. 8 of the drawings is shown. It will be observed that in FIG. 8 of the drawings, the electrical connector 45 is similarly provided with stop flanges 59 in the thread gripping portion 49 to act as a stop point for the conduit 22 inserted therein. As shown in FIG. 17 of the drawings, stop bosses 55 are provided which function to stop and arrest the conduit 22 when inserted through the head gripping portion 49 and through the threaded portion of the connector 45. Hence, it will be evident from FIGS. 16 and 17 of the drawings, that the connectors, in each embodiment thereof, may be formed with the bosses at either the head gripping portion or at the terminal end of the threaded portion.

It will be appreciated from the above description, that the embodiments depicted in FIGS. 8 through 15 of the drawings all relate to a one-piece electrical connector of the type generally disclosed herein which are designed to function with a knockout opening which eliminates the residual tabs which remain once a knockout portion is removed in a typical electrical box. It is therefore appreciated that the present invention provides a one-piece electrical connector which is designed to co-act either with an opening having residual tabs, or one that eliminates residual tabs.

It will also be appreciated from a view of all of the drawings showing the various embodiments of the present invention that the one-piece electrical connector of the present invention may be employed either exteriorally of an electrical box or interiorally thereof. It will be appreciated that it is irrelevant with respect to the use of the invention as to whether or not the head gripping portion of the connector is located to the exterior portion of the wall of the electrical box, or to the interior portion. It will be apparent that the obvious advantage to having this arrangement is that the user thereof need not concern himself with the proper orientation of the connector in order to affect a good connection between the conduit inserted therein and the electrical box. It will be appreciated that with respect to some of the embodiments disclosed herein, once the connector has been screw threadedly mounted to the electrical box, it cannot be removed therefrom. Therefore, should the user find that he has installed the connector from either the exterior portion of the box or the interior thereof, it would be of no consequence with regard to the overall interconnection, since the connectors of the present invention are in fact interchangeable.

From the above description, it will be appreciated that each of the three embodiments of the electrical connector described herein is of a unitary integral construction. It will also be appreciated that the construction of the electrical connectors is such that peripheral or extraneous structures are not required or necessary in order to cause a positive locking of the connector in position on the box and simultaneously a positive locking engagement of the conduit within the hollow portion of the connector. It will further be noted that there is no need or requirement that threaded nuts be used in order to secure the connector in position on the box. Hence, the entire operation involving the interconnection of an electrical conduit to an electrical box is achieved with an integral one-piece electrical connector by means of a simple screw threading operation. Indeed, it will be appreciated that where the user employs a tool such as a wrench or pliers, the entire tightening procedure may be done externally of the electrical box such that the operation may be accomplished even where the box is located in very tight or hard to reach places. Another advantage obtained by the integral one-piece electrical connector of the present invention is the fact that the economics of manufacturing are greatly simplified since no extraneous or peripheral structures are necessary incident to the stamping or molding procedure. Indeed, it is contemplated that the electrical connector of the present invention may be made of either a metallic material, or a plastic material, depending upon the requirements of the electricl code in any given location.

It would therefore be appreciated that by virtue of the present invention, a simplified and yet highly practical one-piece electrical connector has been provided. The tightening structures for both tightening the connector into the electrical box as well as tightening the connector onto an electrical conduit are self-contained and accomplished by one tightening procedure which may be accomplished externally of the box.

While there has been described what is at present considered to be the preferred embodiments of the invention, it will be understood that various modifications may be made therein, and it is intended to cover in the appended claims all such modifications as fall within the true spirit and scope of the invention.

I claim:

1. A one-piece electrical conduit connector of the type adapted to interconnect a length of electrical conduit to an electrical box having at least one circular knockout plug which, upon removal, presents a circular knockout portion and at least one residual tab comprising
   a substantially tubular connector body having an outer engagement surface and an inner contacting surface,
   said tubular connector body being sized to accomodate the insertion therein of a length of electrical conduit,
   said outer engagement surface having a threaded portion for engagement with the circular knockout portion of the electrical box,
   residual tab engagement means associated with said threaded portion and adapted to engage the lock with the residual tab formed in the circular knockout portion thereby to engage and lock said connector body into the electrical box,
   said residual tab engagement means formed by a terminal thread included in said threaded portion,
   said terminal thread having at least one receiving slot formed therein,
   said receiving slot being adapted to receive the residual tab when said connector body is fully threaded within the knockout portion,
   said outer engagement surface being further provided with a gripping head portion positioned adjacent to said threaded portion and adapted to facilitate the gripping and threadingly locking engagement of said connector body in the electrical box,
   said connector body being split along the entire length thereof by a longitudinal slot which traverses said threaded portion and said gripping head portion,
   and said inner contacting surface being provided with conduit gripping means for contacting and gripping a portion of conduit inserted within said tubular connector body,
   whereby said tubular connector body may be threadingly engaged within the knockout portion of an electrical box and locked in position when said residual tab engagement means engage the residual tab, while simultaneously, said conduit gripping means contact and grip a portion fo the length of conduit inserted within the tubular connector body thereby to interconnect a length of electrical conduit to an electrical box.

2. The one-piece electrical connector as set forth in claim 1 above, wherein said gripping head portion comprises an octagonal head adapted to remain positioned externally with respect to the electrical box when said connector is lockingly engaged in an electrical box.

3. The one-piece electrical connector as set forth in claim 1 above, wherein said terminal thread is provided with a series of receiving slots along the curvilinear path thereof to accommodate the reception therein of variously sized residual tabs.

4. The one-piece electrical connector as set forth in claim 1 above, wherein said inner contacting surface further include a stop boss positioned adjacent to the end of said threaded portion to function as a stop position for a length of electrical conduit inserted within said tubular connector body.

5. The one-piece electrical connector as set forth in claim 1 above, wherein said conduit gripping means provided on said inner contacting surface comprises at least one gripping ring formed in said inner contacting surface and extending a short distance into said tubular connector body, whereby upon the threading engagement of said connector body in the electrical box, said body is urged to biasingly constrict along the longitudinal slot and force said gripping ring into biting contact with a portion of the length of electrical conduit inserted within said connector body.

6. The one-piece electrical connector as set forth in claim 5 above, wherein said conduit gripping means comprises a series of gripping rings formed in said inner contacting surface and positioned along a linearly arranged path along the length thereof.

7. The one-piece electrical connector as set forth in claim 1 above, wherein said threaded portion of said connector body is formed as a substantially frusto-conical section.

8. The one-piece electrical connector as set forth in claim 7 above, wherein said connector body having said slot traversing said threaded portion and gripping head portion assumes a slit-ring configuration.

9. The one-piece electrical connector as set forth in claim 7 above, wherein said conduit gripping means comprises at least one compression tab formed in said inner contacting surface and adjacent to the terminal thread of said frusto-conical threaded portion, such that the threading engagement of said connector body into the electrical box will force said compression tab into biting contact with the portion of the length of electrical conduit inserted within said connector body.

10. A one-piece electrical conduit connector the type adapted to inter connect a length of electrical conduit to an electrical box having at least one circular knockout opening, comprising, a substantially tubular connector body having an outer engagement surface and an inner contacting surface, said tubular connector body being sized to accomodate the insertion therein of a length of electrical conduit, said outer engagement surface having a threaded portion for engagement with a circular knockout opening in the electrical box, said threaded portion including a terminal thread.

said terminal thread provided with locking means for locking and engaging the knockout opening of the electrical box, said locking means comprising a slot formed along a portion of said terminal thread whereby upon screw threadingly mounting said connector into the knockout opening of the electrical box, a portion of the periphery of the knockout opening will ride into said slot and come into biting engagement with a length of electrical conduit carried within the tubular connector body, said outer engagement surface being further provided with a gripping head portion position adjacent to said threaded portion and adapted to facilitate the gripping and threadingly locking engagement of said connector body in the electrical box, whereby said tubular connector body may be threadingly engaged within the knockout opening of an electrical box and locked in position and said locking means of said terminal thread engage the knockout opening in the electrical box.

11. The one-piece electrical conduit connector as set forth in claim 10 above, wherein said threaded portion of said connector body is formed as a substantially frusto-conical section, and said inner contacting surface having a plane offset with respect to the plane of said outer engagement surface such that a portion of the wall forming said frusto-conical section is thickened relative to the opposed wall portion thereof.

12. The one-piece electrical conduit connector as set forth in claim 10 above, wherein said frusto-conical section forming said threaded portion includes a longitudinal slot extending along the entire length thereof thereby to provide a C shaped spring configuration with regard to said frusto-conical section.

* * * * *